(12) United States Patent
Pierfelice et al.

(10) Patent No.: US 9,578,153 B2
(45) Date of Patent: *Feb. 21, 2017

(54) MOBILE DEVICE CONNECTION SYSTEM (71) Applicant: Toyota Engineering & Manufacturing North America, Inc., Erlanger, KY (US)

(72) Inventors: Jeffrey Edward Pierfelice, Canton, MI (US); Eric Randell Schmidt, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 100 days.

This patent is subject to a terminal disclaimer.

(21) Appl. No.: 14/565,217

(22) Filed: Dec. 9, 2014

(65) Prior Publication Data
US 2015/0093993 A1    Apr. 2, 2015

Related U.S. Application Data

(63) Continuation of application No. 12/980,220, filed on Dec. 28, 2010, now Pat. No. 8,933,782.

(51) Int. Cl.
| | |
|---|---|
| *H04M 1/60* | (2006.01) |
| *H04L 29/06* | (2006.01) |
| *H04W 4/02* | (2009.01) |
| *H04W 4/04* | (2009.01) |
| *H04W 12/06* | (2009.01) |
| *H04L 29/08* | (2006.01) |
| *H04W 76/02* | (2009.01) |

(52) U.S. Cl.
CPC ........ *H04M 1/6091* (2013.01); *H04L 63/0861* (2013.01); *H04L 63/10* (2013.01); *H04L 67/12* (2013.01); *H04W 4/023* (2013.01); *H04W 4/04* (2013.01); *H04W 12/06* (2013.01); *H04W 76/023* (2013.01); *H04W 76/02* (2013.01)

(58) Field of Classification Search
CPC .... G06K 19/0723; H04B 5/02; H04M 1/7253; H04M 1/72527; H04M 1/6066; H04M 1/6075; H04M 1/6083; H04M 1/6091
USPC ............ 340/5.81–5.83, 1.1, 5.1, 5.8; 455/39, 455/41.2, 41.3, 66.1, 569.1, 569.2, 575.9, 512, 455/513, 41.1, 99
See application file for complete search history.

(56) References Cited

U.S. PATENT DOCUMENTS

| | | | |
|---|---|---|---|
| 6,034,617 A | * | 3/2000 | Luebke et al. ............... 340/5.62 |
| 6,862,443 B2 | | 3/2005 | Witte |
| 7,437,183 B2 | | 10/2008 | Makinen |
| 7,756,478 B2 | | 7/2010 | Eisenbach |

(Continued)

*Primary Examiner* — An T Nguyen
(74) *Attorney, Agent, or Firm* — Snell & Wilmer LLP (57) ABSTRACT

A mobile device connection system may identify a mobile device of a present driver and prioritize a wireless connection between the identified mobile device and a built-in hands-free device located in a motor vehicle. The mobile device connection system may include a sensor and a controller. The sensor may be configured to sense an identity of a driver when the driver is within a proximity of the motor vehicle and generate a signal based on the sensed identity. The controller may be coupled to the sensor, and it may be configured to identify the mobile device based on the signal from the sensor, search and detect the identified mobile device, and establish a wireless connection between the detected mobile device and the built-in hands-free device.

22 Claims, 6 Drawing Sheets

(56) References Cited

U.S. PATENT DOCUMENTS

| | | | |
|---|---|---|---|
| 2002/0177472 A1* | 11/2002 | Tomoda et al. | 455/569 |
| 2003/0003892 A1* | 1/2003 | Makinen | 455/345 |
| 2003/0058086 A1* | 3/2003 | Hara | 340/425.5 |
| 2003/0114104 A1* | 6/2003 | Want et al. | 455/39 |
| 2006/0094355 A1 | 5/2006 | Lin | |
| 2007/0096938 A1 | 5/2007 | Lopez et al. | |
| 2008/0167806 A1 | 7/2008 | Wheeler et al. | |
| 2010/0056055 A1 | 3/2010 | Ketari | |
| 2010/0066492 A1 | 3/2010 | Tarmoom et al. | |
| 2010/0222940 A1 | 9/2010 | Putsch | |
| 2010/0280711 A1 | 11/2010 | Chen et al. | |
| 2011/0137773 A1* | 6/2011 | Davis et al. | 705/34 |

* cited by examiner

MOBILE DEVICE CONNECTION SYSTEM

CROSS REFERENCE TO RELATED APPLICATION

This application is a continuation of U.S. application Ser. No. 12/980,220 entitled Mobile Device Connection System, filed on Dec. 28, 2010, which is hereby incorporated by reference in its entirety.

BACKGROUND

1. Field

The present invention relates generally to mobile devices, and more particularly to a mobile device connection system.

2. Description of the Related Art

In recent years, mobile devices, such as cellular phones, have become major communication tools. However, it may be unsafe for a driver to handle a mobile device while driving because doing so will divert the driver's attention from the changing conditions of the road. To address this issue, some wireless device companies have introduced various hands-free devices. A hands-free device may provide a communication (input-output) interface and allow a driver to use the mobile device without actually holding it. Due to their convenient features, demand for hands-free devices has been growing rapidly since their introduction.

To satisfy this demand, vehicle manufacturers have manufactured vehicles that include built-in hands-free devices or other communication interface devices. The built-in hands-free devices may be wirelessly connected to a mobile device by using a connection system. The connection system may detect the presence of a mobile device during an initial pairing process. Thereafter, the connection system may connect the paired mobile device to the hands-free device each time the paired mobile device is detected.

Conventional connection systems may keep a pairing list, which records a number of mobile devices that have already been paired. In the pairing list, the mobile devices may appear in a sequence according to the order in which they were previously paired. When there is more than one mobile device located in the vehicle, the mobile device that appears earlier in the pairing list may be detected before a mobile device that appear later in the pairing list. Once a mobile device is detected, it may be connected to the hands-free device, whereas the not-yet-detected mobile devices will not be connected.

Conventional connection systems lack the capability of identifying or recognizing the identity of the present driver. As such, conventional connection systems suffer from several drawbacks. First, during the detection process, conventional connection systems are unable to give priority to the mobile device of the driver. This is especially true when the mobile device of the driver appears after the other mobile devices in the pairing list. As a result, the mobile device of the driver will not be detected until after the other mobile devices are searched, and the connection process may be unnecessarily prolonged.

Second, conventional connection systems are unable to determine whether a mobile device belongs to a driver or a passenger. As such, conventional connection systems may detect a passenger's mobile device before detecting the driver's mobile device. Instead of the driver's mobile device, conventional connection systems may connect the passenger's mobile device to the hands-free device. As a result, the driver may be unable to use the built-in hands-free device when other mobile devices are located in the vehicle.

Thus, there is a need to provide a mobile device connection system with improved qualities.

SUMMARY

One or more embodiments of the present invention may provide a mobile device connection system. The mobile device connection system may identify a mobile device of a targeted person and prioritize a wireless connection between the identified mobile device and a communication interface device, such as a hands-free device.

In one embodiment, the present invention may provide a mobile device connection system for wirelessly connecting a mobile device to an input-output interface located in a motor vehicle. The mobile device connection system may include a sensor configured to sense an identity of a driver when the driver is within a proximity of the motor vehicle and generate a signal based on the sensed identity, and a controller coupled to the sensor, and configured to identify the mobile device based on the signal from the sensor, search and detect the identified mobile device, and establish a wireless connection between the detected mobile device and the input-output interface.

In another embodiment, the present invention may provide a mobile communication device connection system, which may include a sensor configured to sense data from an identity device and generate a signal based on the sensed data, a controller responsive to the signal, and configured to determine an association between the sensed data and a mobile communication device, and a transceiver coupled to the controller, and configured to establish a wireless connection with the mobile communication device based on the association between the mobile communication device and the sensed data.

In yet another embodiment, for example, the present invention may include a method for connecting one or more mobile devices to a motor vehicle. The method may include the steps of sensing, using a sensor, an identity of a driver, and establishing a wireless connection between one of the mobile devices and the motor vehicle based on the sensed identity.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Apparatus, systems and methods that implement the embodiment of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between reference elements. In addition, the first digit of each reference number indicates the figure in which the element first appears.

Figure 1:
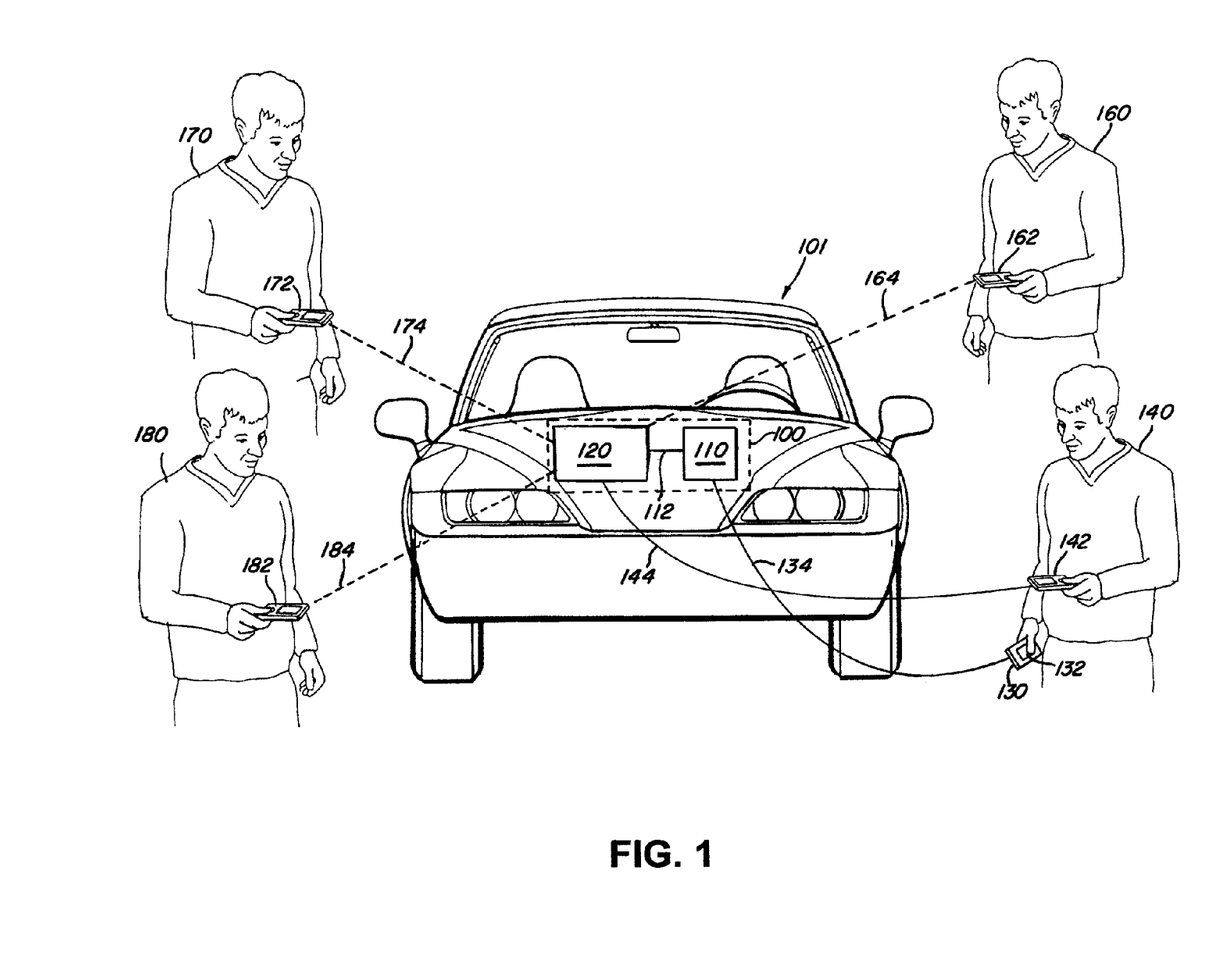
FIG. 1 is a perspective view of a vehicle having a mobile device connection system according to an embodiment of the present invention.

FIG. 1 is a perspective view of a vehicle 101 having a mobile (wireless) device connection system 100 according to an embodiment of the present invention. The mobile device connection system 100 may be used for wirelessly connecting a mobile device to an input-output interface located in a motor vehicle, such as the vehicle 101. The vehicle 101 may be an automobile, a car, a sport utility vehicle, a truck, or other vehicle that holds passengers.

The mobile device may be an electronic device having wireless connection capability. For example, the mobile device may be a cell phone, a smart phone, a personal digital assistance (PDA) device, a laptop, or any other wireless electronic device. The wireless connection may be based on an open wireless technology standard for exchanging data over short distances (using short wavelength radio transmissions) between fixed and mobile devices. For example, the wireless connection may be a Bluetooth connection.

After being connected to the input-output interface via the wireless connection, the mobile device may be accessed, controlled, and/or interacted with the input-output interface. For example, the input-output interface may be a built-in hands-free device, through which a driver may access, control, and interact with a mobile phone.

The mobile device connection system 100 may be installed in various locations within the vehicle 101. For example, the mobile device connection system 100 may be installed adjacent to controls or a dash board of the vehicle 101. In another example, the mobile device connection system 100 may be installed underneath the driver seat of the vehicle 101. In another example, the mobile device connection system 100 may be installed in the middle section of the vehicle 101.

The mobile device connection system 100 may identify the identity of a driver 140. After identifying the identity of the driver 140, the mobile device connection system 100 may selectively, solely and exclusively connect a mobile device 142 of the identified driver 140 to the input-output interface. During the connection process, the mobile device connection system 100 may distinguish the mobile device 142 of the driver 140 from the mobile devices 162, 172, and 182 of the passengers 160, 170, and 180 respectively. As such, the mobile device connection system 100 may prioritize the connection of the driver's mobile device 142 over the passengers' mobile devices 162, 172, and 182.

Generally, the mobile device connection system 100 may include a sensor 110 and a controller 120. The controller 120 may be coupled to the sensor 110. The driver 140 may carry an identity device 130, which may contain identity data 132 related to the identity of the driver 140. The identity device 130 may be uniquely assigned to a particular driver 140, such that the sensor 110 may sense the identity of the driver 140 by sensing the identity data 132 from the identity device 130.

The identity device 130 may be an active radio frequency (RF) device or a passive RF device. If the identity device 130 is an active RF device, such as an electronic key fob, the sensor 130 may be an RF transceiver capable of receiving an RF signal from the identity device 130. If the identity device 130 is a passive RF device, such as a stand-alone radio frequency identification (RFID) tag, the sensor 110 may be an RF interrogator capable of detecting and retrieving data from the RFID tag.

When the identity device 130 is within the proximity of the vehicle 101, the sensor 110 may initiate a sensing process 134. The sensing process 134 may begin before the vehicle 101 is started. Depending on the detection range of the sensor 110, the identity device 130 may be within the proximity of the vehicle 101 when the identity device 130 is about 1 meter to about 5 meters away from the vehicle 101. As such, the sensing process 134 may begin as soon as the driver 140 remotely unlocks the door of the vehicle 101.

After the identity of the driver 140 is sensed, the sensor 110 may generate an identity signal 112 based on the sensed identity retrieved from the identity data 132. The controller 120 may receive and respond to the identity signal 112 from the sensor 110.

The controller 120 may determine the identity of the driver 140 based on the identity signal 112. After determining the identity of the driver 140, the controller 120 may determine an association between the driver's identity and the driver's mobile device 142. The association may be previously recorded in the controller 120 during an initial pairing process. After identifying the driver's mobile device 142, the controller 120 may establish a wireless connection 144 between the driver's mobile device 142 and the input-output interface of the vehicle 101. For example, the controller 120 may establish a Bluetooth connection between the driver's mobile device 142 and a built-in hands-free device located inside the vehicle 101.

In establishing the wireless connection 144, the controller 120 may distinguish the driver's mobile device 142 from the passenger's mobile devices 162, 172, and 182. The driver's mobile device 142 may receive priority in during the search and detection process by the controller 120. As such, the controller 120 may defer the searching and detecting of the passengers' mobile devices 162, 172, and 182 until the occurrence of certain events, which may include, but is not limited to (1) the situation where the driver's mobile device 142 has been searched but not detected, and (2) the situation where the driver's mobile device 142 was offered a connection with the input-output interface, but such offer has been declined or has expired.

The mobile device connection system 100 may ensure that the driver's mobile device 142 may be connected to the input-output interface once it is detected. As such, the mobile device connection system 100 may avoid the situation in which one of the passenger's mobile devices 162, 172, and 182 may be connected to the input-output interface while the driver's mobile device 142 remains unconnected.

Additionally, the mobile device connection system 100 may reduce the average time spent on connecting to the driver's mobile device 142 because less time may be spent on searching for the mobile devices that do not belong to the driver 140. In one embodiment, for example, the mobile device connection system 100 may spend no time on searching for mobile devices that do not belong to the driver 140.

If the driver's mobile device 142 is not detected, the controller 120 may then search for the passengers' mobile devices 162, 172, and 182 according to a predefined sequence. Generally, the predefined sequence may be based on the order in which the mobile devices 162, 172, and 182 were initially paired with the input-output interface.

Hypothetically, the first mobile device 182 may be paired before the second mobile device 162, which may in turn be paired before the third mobile device 172. As such, the first mobile device 182 may appear before the second mobile device 162 in the predefined sequence. Similarly, the second mobile device 162 may appear before the third mobile device 172 in the predefined sequence.

According to the predefined sequence, the controller 120 may first search for the first mobile device 182. If the first mobile device 182 is detected, the controller 120 may establish a first wireless connection 184 between the first mobile device 182 and the input-output (I/O) interface.

If the first mobile device 182 is not detected, the controller 120 may follow the predefined sequence and continue to search for the second mobile device 162. If the second mobile device 162 is detected, the controller 120 may establish a second wireless connection 164 between the second mobile device 162 and the I/O interface.

Otherwise, the controller 120 may continue to search for the third mobile device 172 and attempt to establish a third wireless connection 174 between the third mobile device 172 and the I/O interface. This process may continue to additional mobile devices.

Although FIG. 1 shows that only the driver 140 carries the identity device 130, the passengers 160, 180, and 170 may each carry a different identity device, which may contain identity data related to the identity of each passenger 160, 170, or 180. Assigning each passenger with a different identity device may be beneficial because each passenger may take turns driving the vehicle 101. For example, when the first passenger 180 becomes the driver, the mobile device connection system 100 may grant priority to the first mobile device 182 for establishing the first wireless connection 184 with the I/O interface.

Figure 2:
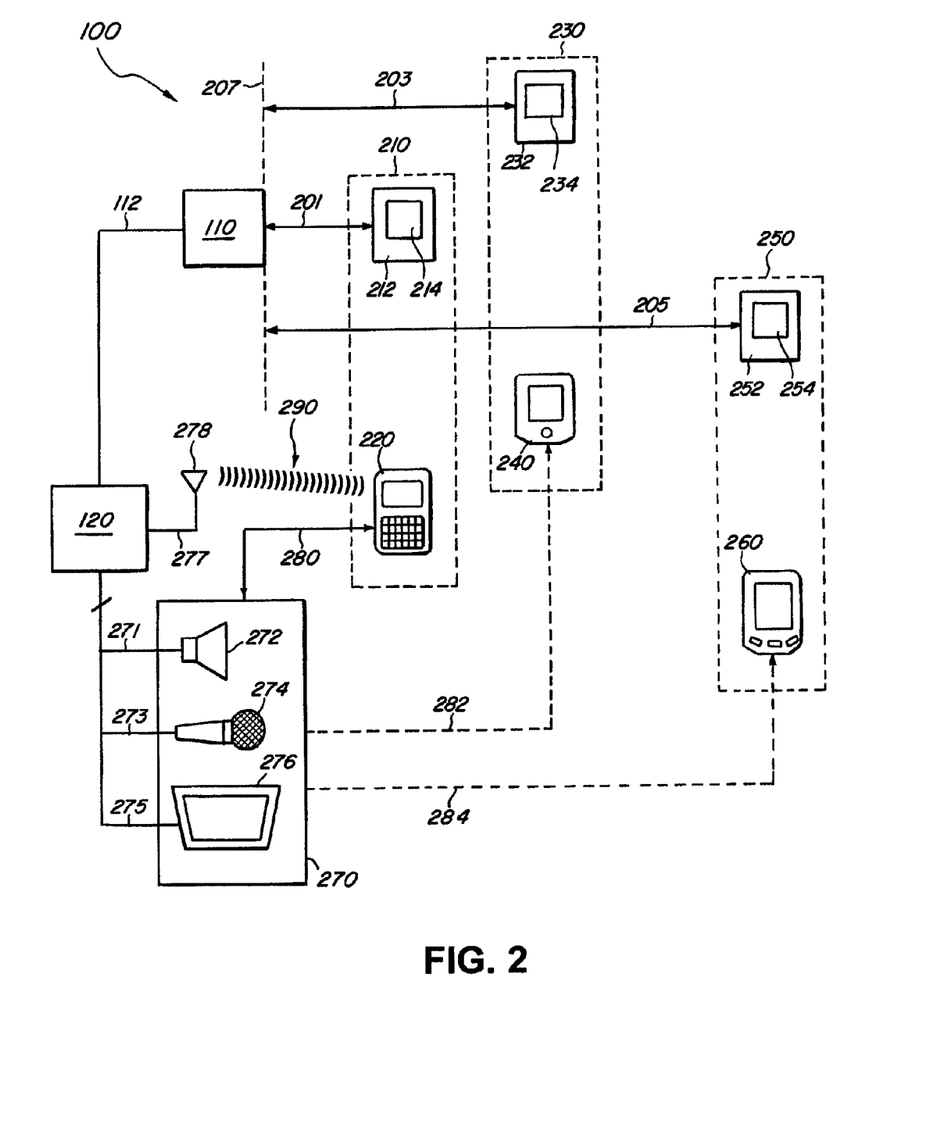
FIG. 2 is a block diagram of a mobile device connection system according to an embodiment of the present invention.

According to an embodiment of the present invention, the mobile device connection system 100 may be used in conjunction with multiple identity devices. As shown in FIG. 2, a motor vehicle may contain a first passenger 210 carrying a first identity device 212 and a first mobile device 220, a second passenger 230 carrying a second identity device 232 and a second mobile device 240, and a third passenger 250 carrying a third identity device 252 and a third mobile device 260. The first identity device 212 may store first identity data 214, which may be related to the identity of the first passenger 210. The second identity device 232 may store second identity data 234, which may be related to the identity of the second passenger 230. The third identity device 252 may store third identity data 254, which may be related to the identity of the third passenger 250.

Each of the first 210, second 230, and third 250 passengers may potentially become the driver. For example, the first passenger 210 may occupy the driver seat, while the second passenger 230 may occupy a passenger seat located next to the driver seat and the third passenger 250 may occupy another passenger seat located behind the driver seat. In one situation, the person who occupies the driver seat may be presumed to be the driver. Because each identity device 220, 240, or 260 is positioned close to the passenger with which it is purported to identify, the identity device may be used for indicating the position of the passenger. Hence, a distance measured between the identity device and the driver seat may be used for determining who the driver is. More specifically, the driver may be a passenger having the identity device that maintains the shortest distance from the driver seat.

The sensor 110 may be placed at a reference position 207, which may be an area close to the driver seat. In one embodiment, for example, the reference position 207 may be located adjacent to the steering wheel. In another embodiment, for example, the reference position 207 may be located above the driver's seat. In yet another embodiment, for example, the reference position 207 may be located under the driver's seat.

The first identity device 212 may maintain a first distance 201 from the reference position 207. The second identity device 232 may maintain a second distance 203 from the reference position 207. The third identity device 252 may maintain a third distance 205 from the reference position 207. The sensor 110, being placed at the reference position 207, may sense and determine each of the first 201, second 203, and third 205 distances.

In one embodiment, the sensor 110 may estimate the first 201, second 203, and third 205 distances by detecting the signal strength of the data signals received from the first 212, the second 232, and the third 252 identity devices. Typically, strong signal strength may indicate a short distance whereas weak signal strength may indicate a long distance. For the example presented in FIG. 2, the signal strength of the first identity device 212 at the reference position 207 may be stronger than those of the second 232 and third 252 identity devices. The sensor 110 may rank the signal strengths of the first 212, second 232, and third 252 identity devices. Accordingly, the sensor 110 may estimate that the first distance 201 may be shorter than the second 203 and third 205 distances. Accordingly, the sensor 110 may determine that the first identity device 212 belongs to the present driver, and it may be ready to sense the identity of the driver.

After determining that the first identity device 212 belongs to the present driver, the sensor 110 may selectively sense the first identity data 214 from the first identity device 212 while ignoring the second 234 and third 254 identity data from the respective second 232 and third 252 identity devices. The sensor 110 may generate the identity signal 112 based on the sensed identity data. The controller 120 may receive the identity signal 112 via a hard wired or wireless connection. The controller 120 may process the information embedded in the identity signal 112 and thereby associating the driver's mobile device with the sensed identity data. For example, the controller 120 may associate the first mobile device 220 with the first identity data 214.

Next, the controller 120 may search for the associated mobile device by sending and receiving an antenna signal 277 via an antenna 278. The antenna 278 may broadcast a wireless detecting signal 290 for detecting the associated mobile device, which may be the first mobile device 220 in this example. If the associated mobile device is detected, the controller 120 may establish a wireless connection between the detected mobile device and the input-output (I/O) interface 270 (a.k.a. communication interface). If the associated mobile device is not detected, the controller 120 may begin searching and detecting other mobile devices according to a predefined sequence.

For example, the controller 120 may first search for the first mobile device 220 because the first mobile device 220 is associated with the first identity data 214. If the first mobile device 220 is detected, the controller 120 may establish a first wireless connection 280 between the first mobile device 220 and the I/O interface 270. Otherwise, the controller 120 may establish a second wireless connection 282 between the second mobile device 240 and the I/O interface 270, or alternatively, the controller 120 may establish a third wireless connection 284 between the third mobile device 260 and the I/O interface 270.

After the wireless connection is established between the detected mobile device and the I/O interface 270, the driver may access, control, and interact with the connected mobile device via the I/O interface 270. The I/O interface 270 may include one or more input devices and/or output devices. In one embodiment, for example, the I/O interface 270 may include a microphone 274, a touch screen 276, and/or a key pad (not shown). As such, the I/O device 270 may receive audio and data inputs for the connected mobile device. In another embodiment, for example, the I/O interface 270 may include a speaker 272 and/or a display screen (not shown). As such, the I/O interface 270 may deliver audio and video outputs for the connected mobile device.

The wireless connection between the connected mobile device and the I/O interface 270 may be direct or indirect. If the wireless connection is direct, the connected mobile device may communicate with the I/O interface 270 without the help of the controller 120. In the direct connection mode, the I/O interface 270 may include a transceiver (not shown) for sending and receiving wireless signals.

If the wireless connection is indirect, the connected mobile device may communicate with the I/O interface 270 via the controller 120. That is, a wireless connection may be established between the connected mobile device and a transceiver that controls the antenna 278. For example, the controller 120 may transmit an audio output signal 271 from the connected mobile device to the speaker 272. In another example, the controller 120 may transmit an audio input signal 273 from the microphone 274 to the connected mobile device. In another example, the controller 120 may transmit a visual output signal 275 from the connected mobile device to the touch screen 276.

Figure 3A:
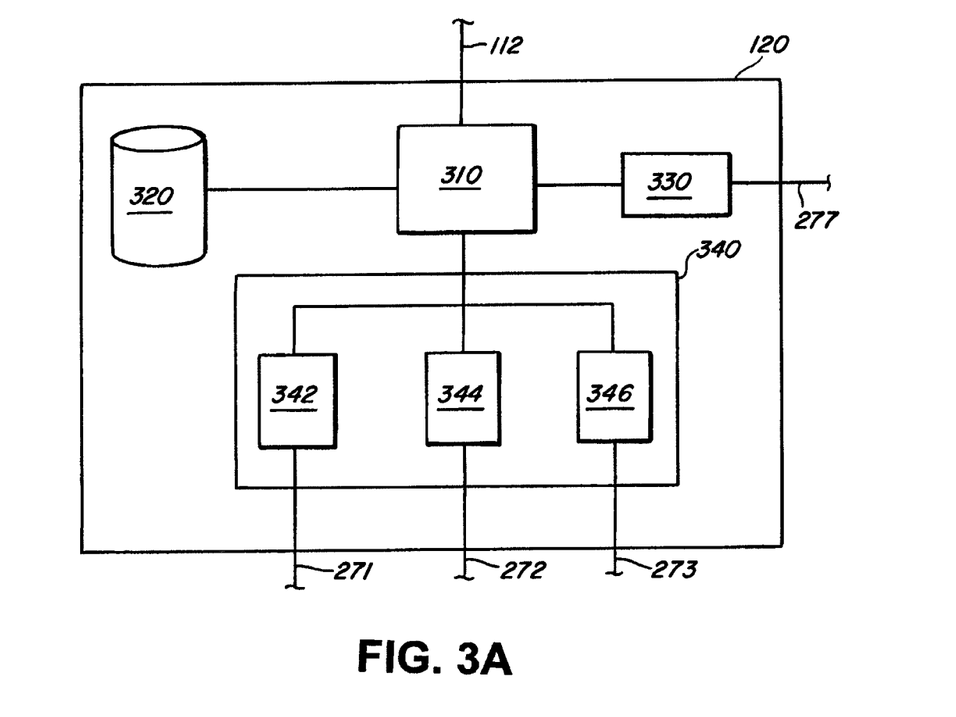
FIG. 3A is a block diagram of a controller according to an embodiment of the present invention.

FIG. 3A shows a block diagram of a controller 120 according to an embodiment of the present invention. Generally, the controller 120 may include a processor 310 and a memory 320. The processor 310 may be coupled to the memory 320. The processor 310 can be any computing device capable of receiving data, processing the received data, and outputting the processed data. The processor 310 may be implemented using hardware, software, firmware, middleware, microcode, or any combination thereof. The processor 310 may be an Advanced RISC Machine (ARM), a computer, a digital signal processor (DSP), a microprocessor, a processor chip, and/or any other device capable of processing data. The memory 320 may include and/or store various routines and/or data. The term "memory" includes, but is not limited to, random access memory (RAM), flash memory, read-only memory (ROM), EPROM, EEPROM, registers, hard disk, removable disk, CD-ROM, DVD, Blu-ray disk, wireless channels, and/or various other media capable of storing, containing or carrying instruction(s) and/or data.

Figure 3B:
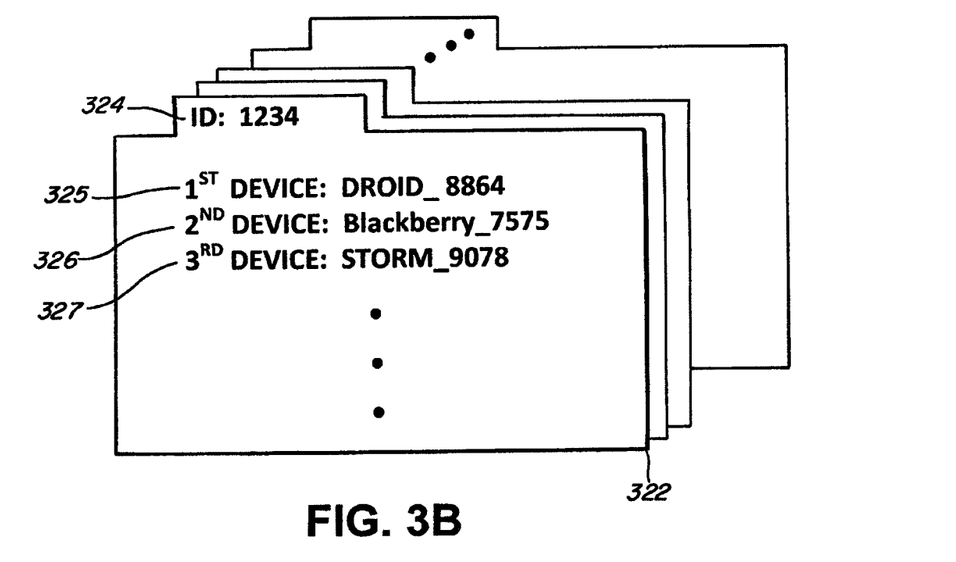
FIG. 3B is a data structure of a record according to an embodiment of the present invention.

The memory 320 may store one or more records. For example, FIG. 3B shows a data structure of a record 322 according to an embodiment of the present invention. The record 322 may include an identity field 324 and at least a first mobile device field 325. During an initial pairing process, the processor 310 may write the identity data of a driver into the identity field 324 of the record 322. For example, the processor 310 may write the identity data "1234" into the identity field 324 of the new record 322.

The identity data "1234" may be sensed from an identity device as discussed in FIGS. 1 and 2. Alternatively, the identity data "1234" may be generated by the processor 310, and it may be used for representing one or more sensed biometric characteristics of a driver.

The processor 310 may detect a first mobile device of the driver, and it may write a first mobile device code into the first mobile device field 325 of the record 322. For example, the processor 310 may write the first mobile device code "DROID_8864" into the first mobile device field 325 to record that the driver's first mobile device is an Android smart phone.

Optionally, if the driver has a second mobile device, the processor 310 may write a second mobile device code into the second mobile device field 326. For example, the processor 310 may write a second mobile device code "BLACKBERRY_7575" into the second mobile device field 326 to record that the driver's second mobile device is a Blackberry PDA device. Similarly, if the driver has a third mobile device, the processor 310 may write a third mobile device code into the third mobile device field 327. For example, the processor 310 may write a third mobile device code "STORM" into the third mobile device field 327 to record that the driver's third mobile device is a Storm smart phone. Each of the first, second, and third mobile device codes may be used for identifying the first, second, and third mobile devices respectively. Each record 322 may have as many mobile device fields as the size of the memory 320 may allow.

After being created, updated, and stored, the record 322 may be used later for associating a sensed identity of a driver to a particular mobile device. Referring again to FIG. 3A, the processor 310 may receive the identity signal 112 from the sensor 110. The processor 310 may extract the sensed identity data from the received identity signal 112. The process 310 may then access the memory 320 and match the sensed identity data against the identity field 320 of the records 322. When a match is found, the processor 310 may decode the first mobile device code, which may be stored in the first mobile device field 325 of the matched record 322. The processor 310 may use the decoded information to identify the first mobile device, and thereby establishing an association between the sensed identity data and the identified first mobile device.

The processor 310 may search and detect the first mobile device based on the established association. A transceiver 330 may be coupled to the processor 310, and it may be used for generating and receiving the antenna signal 277 during the search and detect process. In one embodiment, for example, the transceiver 330 may be a Bluetooth transceiver. If the first mobile device is detected, the processor 310 may establish a wireless connection between the detected first mobile device and the I/O interface 270 as shown in FIG. 2. In one embodiment, for example, the wireless connection may include a Bluetooth connection.

If the first mobile device is not detected, the processor 310 may decode the second mobile device code, which may be stored in the second mobile device field 326 of the matched record 322. After decoding the second mobile device code, the processor 310 may identify the second mobile device, and thereby establishing an association between the sensed identity data and the identified second mobile device. The processor 310 may search and detect the second mobile device based on the established association. If the second mobile device is detected, the processor 310 may establish a wireless connection between the detected second mobile device and the I/O interface 270 as shown in FIG. 2.

If the second mobile device is not detected, the processor 310 may repeat the above process until an associated mobile device is detected, or alternatively, until the matched record 322 indicates that the driver has no more mobile device. In the event that the processor 310 does not detect any associated mobile device for a particular driver, the processor 310 may begin detecting other mobile devices. The processor 310 may wirelessly connect the detected mobile device to the I/O interface 270.

In order to access, control, and interact with the I/O interface 270, the processor 310 may be coupled to an input-output (I/O) driver block 340, which may include one or more input or output drivers. In one embodiment, for example, the I/O driver block 340 may include an audio output driver 342 for generating the audio output signal 271. In another embodiment, for example, the I/O driver block 340 may include an audio input driver 344 for receiving the audio input signal 272. In yet another embodiment, for example, the I/O driver block 340 may include a video output driver 346 for generating the video output signal 273.

Although FIG. 3A shows that the processor 310 and the memory 320 are implemented separately, the processor 310 and the memory 320 may be implemented by a single integrated circuit according to an alternative embodiment of the present invention. Moreover, the transceiver 330 and the I/O driver block 340 may be combined to form a single device, which may be coupled to the single integrated circuit comprising the processor 310 and the memory 320.

As discuss previously in FIG. 1, the sensor 110 may be used for sensing the identity of the driver, and it may generate an identity signal 112 based on the sensed identity. The identity of the driver may be stored or preprogrammed into an identity device. The identity device may be an active radio frequency (RF) device or a passive radio frequency (RF) device.

Figure 4A:
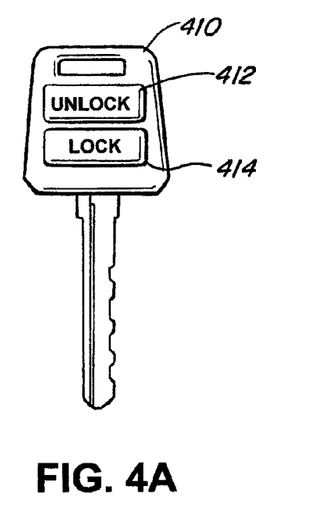
FIGS. 4A-4B are perspective views of two identity devices according to an embodiment of the present invention.

The active RF device may actively transmit the identity data to the sensor 110 without the initiation of the sensor 110. For example, as shown in FIG. 4A, the active RF device may be an electronic key fob 410, which may include an unlock button 412 and a lock button 414. The electronic key fob 410 may include a memory device for storing the identity data. When the unlock button 412 is depressed, the electronic key fob 410 may send an unlocking signal to the motor vehicle for unlocking one or more doors thereof. The unlocking signal may be embedded with the identity data, which may be received and sensed by the sensor 110.

The active RF device may allow the sensor 110 to sense the identity of the driver even when the driver is outside the motor vehicle. Hence, the controller 120 may begin searching and detecting the driver's mobile device before the driver opens or starts the motor vehicle. Advantageously, using the active RF device as an identity device may allow the driver's mobile device to be wireless connected to the I/O interface 270 before the driver enters the motor vehicle.

The active RF device may be any device capable of storing the identity data and transmitting the identity data. As such, the active RF device may be integrated with a mobile device capable of transmitting short range RF signals. Alternatively, the active RF device may be an active radio frequency identification (RFID) tag, which may periodically, repeatedly, or continuously broadcast a short range RF signal that carries the identity data.

Figure 4B:
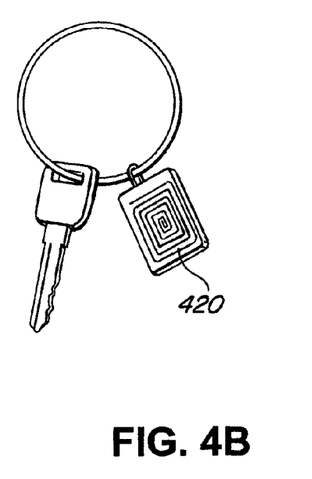

The passive RF device may passively transmit the identity data to the sensor 110 upon receiving a request from the sensor 110. For example, as shown in FIG. 4B, the passive RF device may be a passive radio frequency identification (RFID) tag 420. The passive RFID tag 420 may receive an interrogation signal from the sensor 110, and it may reflect the interrogation signal back to the sensor 110 when the interrogation signal is in resonance with the passive RFID tag 420. As such, the sensor 110 may sense the identity data from the passive RFID tag 420 if the interrogation signal is at a frequency that resonates with that of the passive RFID tag 420.

The passive RF device, such as the passive RFID tag 420, may be convenient to carry because of its light weight and small size. Accordingly, the driver may carry the passive RFID tag 420 with a key chain or in a wallet. Moreover, the passive RFID tag 420 may be embedded in a flash memory card, such as a micro SD card, which is commonly used as a storage means for mobile device. Advantageously, using the passive RF device as an identity device may allow the driver's mobile device to be wireless connected to the I/O interface 270 before the driver enters the motor vehicle.

Figure 4C:
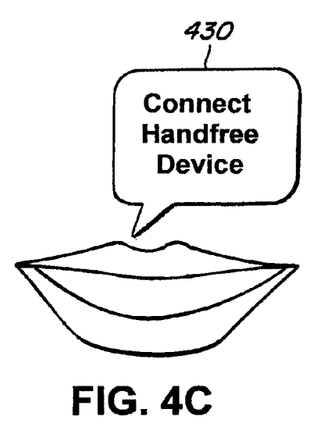
FIGS. 4C-4E are various driver biometric characteristics or objects according to an embodiment of the present invention.

Besides sensing the identity data from the identity device, the sensor 110 may include a biometric sensor, which may sense the identity of the driver by sensing one or more biometric characteristics of the driver. As shown in FIG. 4C, for example, a vocal feature 430 may be a biometric characteristic of a driver. The sensor 110 may be a voice sensor, which may sense the identity of the driver by recognizing the vocal feature 430 of the driver. In one embodiment, the voice sensor may be a stand-alone device. In another embodiment, the voice sensor may be integrated with the microphone 274 as shown in FIG. 2.

Figure 4D:
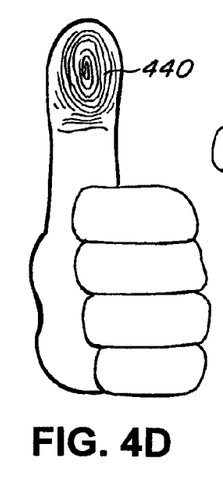

As shown in FIG. 4D, for example, a fingerprint pattern 440 may be a biometric characteristic of a driver. The sensor 110 may be a fingerprint sensor, which may sense the identity of the driver by recognizing the fingerprint pattern 440 of the driver. In one embodiment, the fingerprint sensor may be a stand-alone device. In another embodiment, the fingerprint sensor may be integrated with a power on (ignition) button (not shown) of the motor vehicle.

Figure 4E:
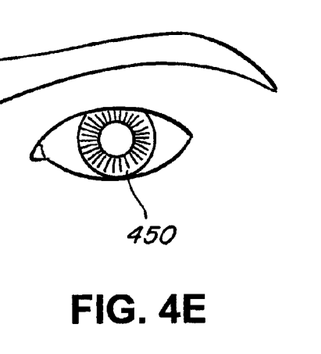

As shown in FIG. 4E, for example, a retina pattern 440 may be a biometric characteristic of a driver. The sensor 110 may be a retina sensor, which may sense the identity of the driver by recognizing the retina pattern 440 of the driver. In one embodiment, the retina sensor may be a stand-alone device. In another embodiment, the retina sensor may be integrated with a camera (not shown) installed inside the motor vehicle.

Figure 5:
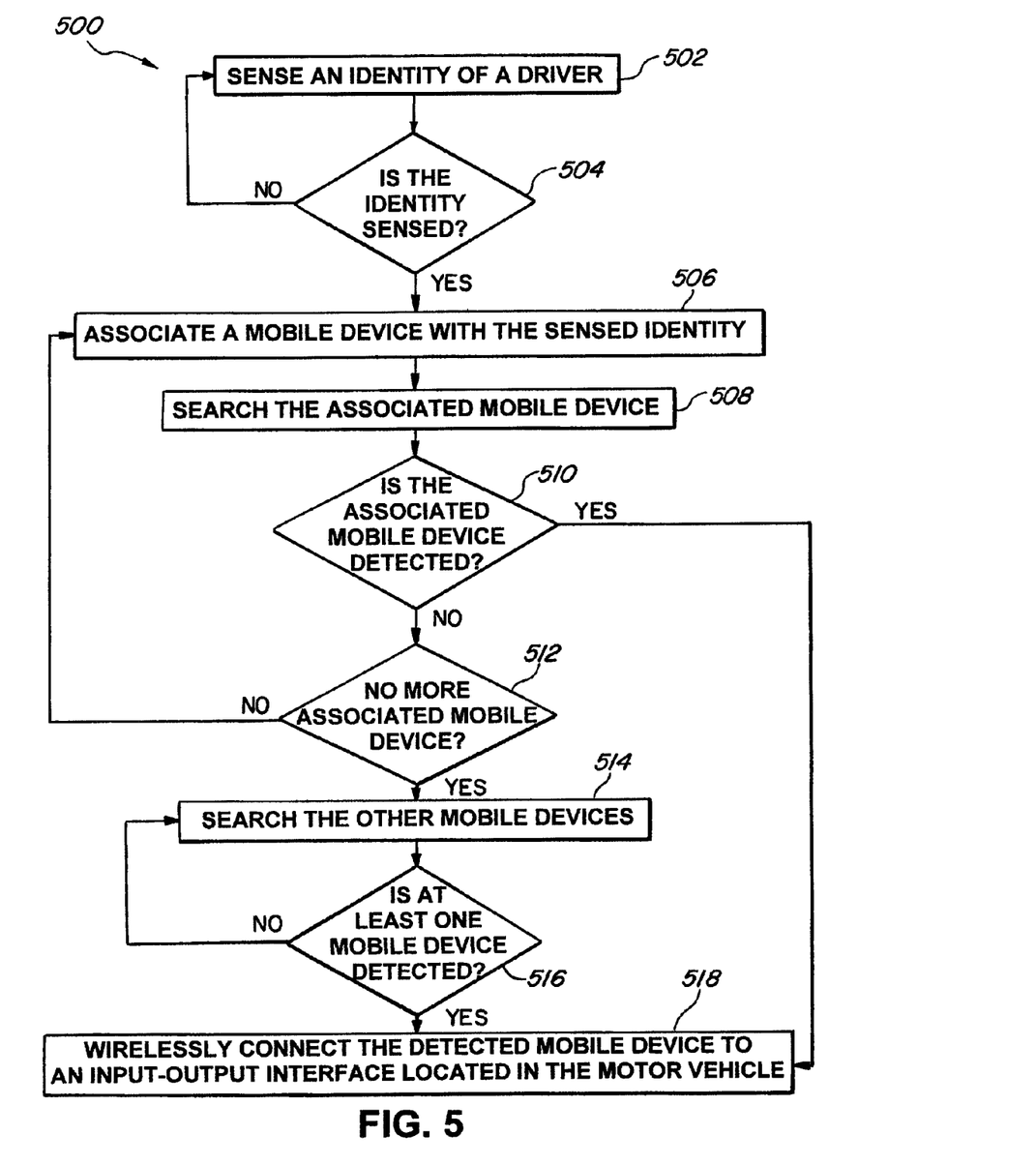
FIG. 5 is a flowchart of a method for wirelessly connecting a mobile device to a motor vehicle according to an embodiment of the present invention.

FIG. 5 shows a flowchart of a method 500 for wirelessly connecting a driver's mobile device to a motor vehicle according to an embodiment of the present invention. In step 502, an identity of a driver may be sensed by using a sensor. Depending on the sensing scheme, the identity of the driver may be sensed by receiving identity data from an identity device or by collecting one or more biometric characteristics from the driver. For example, the identity of the driver may be sensed by sensing identity data from a passive radio frequency device or from an active radio frequency device. In another example, the identity of the driver may be sensed by using a biometric sensor to sense the biometric characteristic of the driver. The biometric characteristic of the driver may include the driver's vocal features, fingerprint pattern, and/or retina pattern.

In step 504, a determination may be made regarding whether the identity of the driver is sensed. If the identity of the driver is sensed, the method 500 may proceed to step 506. Otherwise, the method 500 may return to step 502.

In step 506, a mobile device may be associated with the sensed identity. Typically, a controller may be connected to the sensor, and it may receive the sensed identity from the sensor. The controller may have a predefined list of mobile devices, each of which may be assigned to a particular driver. The controller may use the predefined list, as well as the sensed identity of the present driver, to identify the present driver's mobile device.

Next, in step 508, the associated mobile device may be searched by the controller. For example, detection signals may be transmitted for detecting the presence of the associated mobile device. During the searching and detecting process, any other devices that are not associated to the sensed identity of the present driver may be ignored. As such, the associated mobile device may receive priority in being searched and detected.

In step 510, a determination may be made regarding whether the associated mobile device is detected. If the associated mobile device is detected, the method 500 may proceed to step 518. Otherwise, the method 500 may proceed to step 512.

In step 518, the detected mobile device may be wirelessly connected to an input-output interface located in the motor vehicle. The detected mobile device may be wirelessly connected to the input-output interface by using the controller. In one embodiment, for example, the controller may establish a short range radio frequency connection, such as a Bluetooth connection. The input-output interface may be a communication interface, such as a hands-free device and/or a touch screen. The input-output interface may transmit inputs entered by the driver to the connected mobile device, and it may deliver outputs from the connected mobile device to the driver.

If the associated mobile device is not detected, the method 500 may proceed to step 512, in which a determination may be made regarding whether there is any more mobile device to be associated to the sensed identity of the present driver. If there is another mobile device to be associated to the sensed identity of the present driver, the method 500 may return to step 506. Otherwise, the method 500 may proceed to step 514.

In step 514, the other mobile devices may be searched and detected in a predefined sequence. For example, the predefined sequence may be according to the order in which the other mobile devices are previously discovered and paired. The other mobile devices may belong to one or more passengers, or they may be the unpaired mobile devices of the present driver.

In step 516, a determination may be made regarding whether one of the other mobile devices is detected. If one of the other mobile devices is detected, the method 500 may proceed to step 518, in which the detected mobile device may be wirelessly connected to the input-output interface. Otherwise, the method 500 may return to step 514, in which the other mobile devices may be searched and detected.

Figure 6:
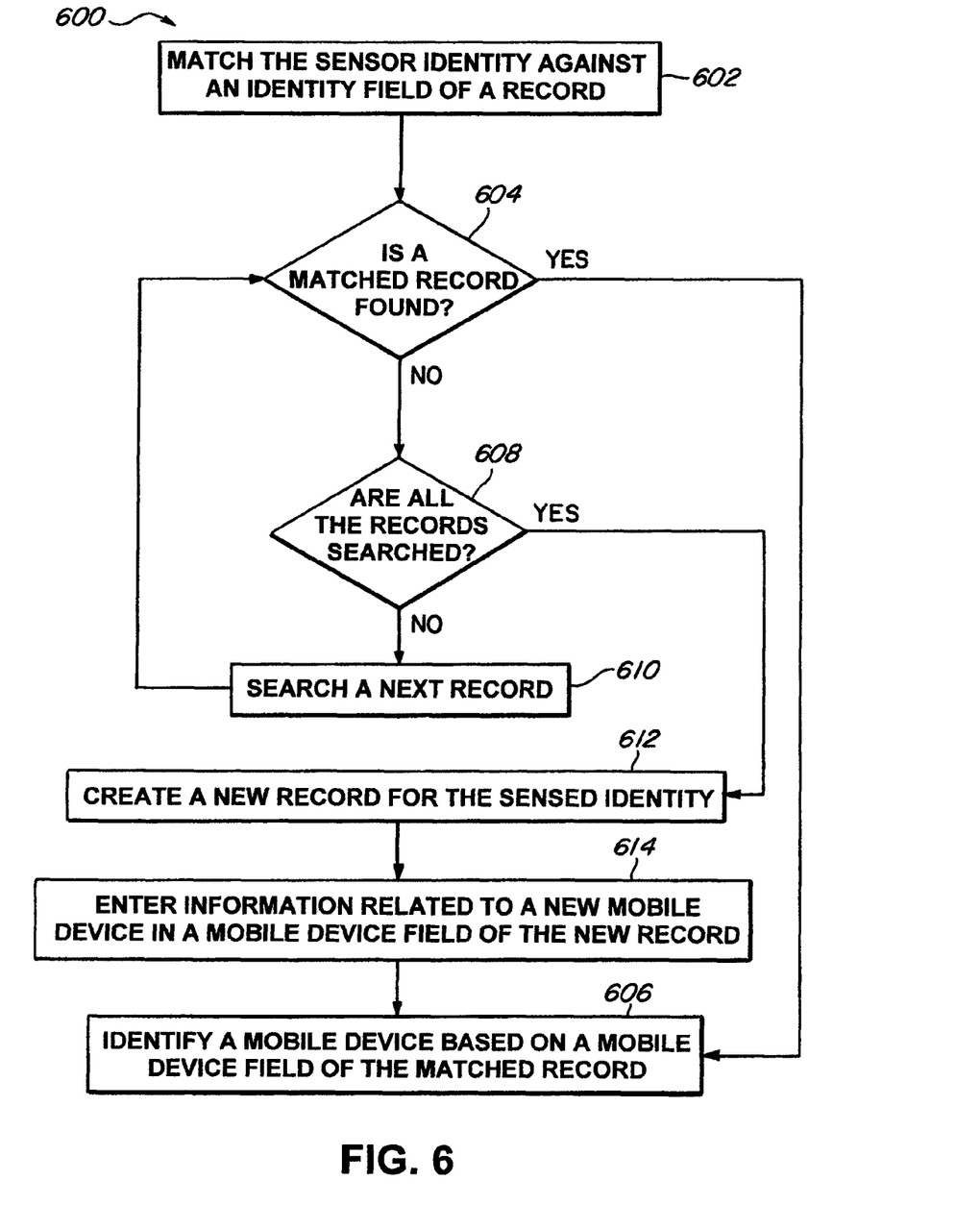
FIG. 6 is a flowchart of a method for associating a mobile device with an identity of a driver according to an embodiment of the present invention.

FIG. 6 shows a flowchart of a method 600 for associating a mobile device with the identity of a driver according to an embodiment of the present invention. Particularly, the method 600 may exemplify and elaborate the implementation of step 506 of the method 500 as discussed in FIG. 5.

In step 602, the sensed identity may be matched against an identity field of a record. The record may be previously created and stored in the controller during an initial pairing process, during which information related to a particular driver's identity, as well as the driver's mobile device, may be recorded.

In step 604, a determination may be made regarding whether a matched record is found. If a matched record is found, the method 600 may proceed to step 606. Otherwise, the method 600 may proceed to step 608.

In step 606, a mobile device may be identified based on a mobile device field of the matched record. Accordingly, the identified mobile device may be associated with the identity of the present driver.

If a matched record is not found in step 604, the method 600 may proceed to step 608, in which a determination may be made regarding whether all the records are searched. If there is no more record to be searched, the method 600 may proceed to step 612. Otherwise, the method 600 may proceed to step 610, in which a next record may be searched. After searching the next record, the method 600 may return to step 604, in which a determination may be made regarding whether the searched record's identity field matches the sensed identity of the present driver.

In step 612, a new record for the sensed identity may be created. In step 614, information related to a new mobile device may be entered in a mobile device field of the new record. If the driver does not have a new mobile device to be added to the new record, the method 600 may be terminated without associating any mobile device with the sensed identity. Otherwise, the method 600 may proceed to step 606, in which the new mobile device may be identified as the present driver's mobile device.

Although the embodiments discussed in FIGS. 1-6 show that the mobile device connection system 100, and the method 500, can be applied to a motor vehicle, such as a car, the mobile device connection system 100, and the method 500, may be applied to other settings as well. Generally, the mobile device connection system 100, and the method 500, may be applied to home, office, and other facilities at which an input-output interface 270 may be installed.

For example, the mobile device connection system 100, and the method 500, may be used for sensing an identity of a selected home member and then wirelessly connecting a laptop computer of the selected home member to a television display screen and/or a home entertainment system. In another example, the mobile device connection system 100, and the method 500, may be used for sensing an identity of a selected office staff member and then wirelessly connecting a laptop computer of the selected office staff member to a projector. In another example, the mobile device connection system 100, and the method 500, may be used for sensing an identity of a selected user and then wirelessly connecting a cell phone of the selected person to a portable global positioning system (GPS).

Moreover, the mobile device connection system 100, and the method 500, may be adjustable in granting priority to the mobile devices of various people. For example, the mobile device connection system 100, and the method 500, may grant priority to the mobile device of a particular house member. In another example, the mobile device connection system 100, and the method 500, may grant priority to the mobile device of a particular staff member of an office. In another example, the mobile device connection system 100, and the method 500, may grant priority to the mobile device of a selected user.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A mobile device connection system for wirelessly connecting a mobile device to a transceiver located in a motor vehicle having a driver area including a driver seat and a steering wheel, and a passenger area including a passenger seat, comprising:
    a memory for storing an association or a pairing between an identity device of a user of the motor vehicle and a mobile device;
    a sensor positioned in the driver area and configured to:
        sense a first identity device and a first identity data of a first user during a first pairing process, and
        sense a second identity device and a second identity data of a second user during a second pairing process;
    a controller coupled to the sensor and the memory, and configured to:
        store a first association or pairing between the first identity data and a first mobile device of the first user,
        store a second association or pairing between the second identity data and a second mobile device of the second user,
        designate the first user as a driver of the motor vehicle when or after a sensed distance of the first identity device is less than a sensed distance of the second identity device,
        designate the second user as the driver when or after a sensed distance of the second identity device is less than a sensed distance of the first identity device,
        establish a first wireless connection between a mobile device of the driver and the transceiver and ignore establishing a second wireless connection between any previously paired mobile device of a passenger of the motor vehicle and the transceiver for expediting or enhancing the establishment of the first wireless connection, and
        establish the second wireless connection when or after the first wireless connection cannot be established and ignore establishing a third wireless connection between a previously unpaired mobile device and the transceiver; and
    an input-output interface coupled to the controller, and configured to receive input from and generate output for the mobile device of the driver via the first wireless connection when or after the first user or the second user is designated as the driver and the first wireless connection can be established.

2. The system of claim 1, wherein:
    before the driver enters the motor vehicle or before the motor vehicle is started, the sensor is configured to sense the first identity data or the second identity data, and
    the controller is configured to detect the first mobile device of the first user when or after the sensed distance of the first identity device indicates that the first user is the driver but before the driver enters the motor vehicle or before the motor vehicle is started.

3. The system of claim 1, wherein:
    the memory is configured to store one or more records, each record having an identifier field and a mobile device field, and
    the controller is configured to:
        match the sensed first identity data against the identifier field of the one or more records, and
        detect the first mobile device based on the mobile device field of the matched record.

4. The system of claim 1, wherein the first identity device is a part of or coupled to the first mobile device.

5. The system of claim 1, wherein the first identity device is an electronic key configured to transmit a wireless signal to the motor vehicle, the wireless signal being detectable by the sensor, and the wireless signal embedding the first identity data.

6. The system of claim 1, wherein the sensor is configured to sense the first identity data of the driver by sensing a biometric characteristic of the first user.

7. The system of claim 6, wherein the biometric characteristic includes at least one of a fingerprint, a voice pattern, a retina pattern, or combinations thereof.

8. The system of claim 1, wherein the sensor is further configured to sense a third identity device and a third identity data of a third user during a third pairing process, and the controller is configured to:
    store a third association or pairing between the third identity data and a third mobile device of the third user,
    assign a higher priority to the second association or pairing over the third association or pairing when the second pairing process is performed before the third pairing process, and assign a higher priority to the third association or pairing over the second association or pairing when the third pairing process is performed before the second pairing process,
    establish a wireless connection between the second mobile device and the transceiver when the first wireless connection cannot be established and the second association or pairing has the higher priority over the third association or pairing, and
    establish a wireless connection between the third mobile device and the transceiver when the first wireless connection cannot be established and the third association or pairing has the higher priority over the second association or pairing.

9. The system of claim 1, wherein:
    the sensor is configured to sense a distance of the first identity device or the first user as the first identity device approaches the motor vehicle and is within a predetermined distance of the motor vehicle, and
    the controller is configured to designate the first user as the driver when the sensed distance of the first identity device indicates that the first user is the driver, before the first user is in the motor vehicle in order to expedite or enhance the establishment of the first wireless connection.

10. The system of claim 1, wherein:
    the sensor is further configured to sense a third identity device and a third identity data of a third user during a third pairing process, and
    the controller is configured to:
        store a third association or pairing between the third identity data and a third mobile device of the third user, receive a user-defined priority for the second association or pairing or for the third association or pairing, and when the first wireless connection cannot be established, establish a wireless connection between the transceiver and one of the second mobile device or the third mobile device based on the user-defined priority.

11. A mobile communication device connection system of a motor vehicle having a driver area including a driver seat and a steering wheel, and a passenger area including a passenger seat, comprising:

a memory for storing an association or a pairing between an identity device of a user of the motor vehicle and a mobile communication device;

a sensor positioned in the driver area and configured to:
sense a first identity data of a first user from a first identity device within a detection range of the sensor and a second identity data of a second user from a second identity device within the detection range of the sensor,
sense a first distance between a distance reference in the driver area and the first identity device and a second distance between the distance reference and the second identity device, and
generate a signal based on the sensed first and second identity data and the sensed first and second distances;

a controller positioned within the motor vehicle and responsive to the signal, and configured to:
store a first association or pairing between the first identity data and a first mobile communication device of the first user,
store a second association or pairing between the second identity data and a second mobile communication device of the second user,
designate the first user as a driver of the motor vehicle when or after the sensed first distance is less than the sensed second distance, and
designate the second user as the driver when or after the sensed second distance is less than the sensed first distance; and a transceiver positioned within the motor vehicle and coupled to the controller, and configured to:
establish a first wireless connection with the first mobile communication device,
ignore establishing a second wireless connection between a previously paired mobile communication device of a passenger of the motor vehicle and the transceiver for expediting or enhancing the establishment of the first wireless connection, and
establish the second wireless connection when or after the first wireless connection cannot be established and ignore establishing a third wireless connection between any previously unpaired mobile communication device and the transceiver; and a communication interface coupled to the controller, and configured to receive input from and generate output for the first mobile communication device via the first wireless connection when or after the first user is designated as the driver and the first wireless connection can be established.

12. The system of claim 11, wherein:
the memory is configured to store one or more records, each record having an identifier field and a mobile communication device field, and
the controller is further configured to:
receive the signal from the sensor,
extract the sensed first identity data of the first identity device from the signal when or after the sensed first distance is less than the sensed second distance,
match the sensed first identity data against the identifier field of one of the records, and
associate the sensed first identity data with the first mobile communication device based on the mobile communication device field of the matched record.

13. The system of claim 11, wherein the first identity device is configured to transmit a wireless signal to the motor vehicle, the wireless signal being detectable by the sensor, and the wireless signal embedding the first identity data.

14. The system of claim 11, wherein the first identity device is one of an active radio frequency device or a passive radio frequency device.

15. The system of claim 11, wherein the first wireless connection is a Bluetooth connection.

16. A method for connecting one or more mobile devices to a motor vehicle having a driver area, including a driver seat and a steering wheel, and a passenger area including a passenger seat, comprising:

sensing, using a sensor positioned in the driver area, a first identity device and a first identity data of a first user during a first pairing process and a second identity device and a second identity data of a second user during a second pairing process;

storing, in a memory, a first association or pairing between the first identity data and a first mobile device of the first user and a second association or pairing between the second identity data and a second mobile device of the second user;

generating, using the first identity device, a first signal having a first signal wave characteristic and embedding the first identity data;

generating, using the second identity device, a second signal having a second signal wave characteristic and embedding the second identity data;

sensing, using the sensor, the first identity data and the first signal wave characteristic when the first identity device is within a proximity of the motor vehicle;

sensing, using the sensor, the second identity data and the second signal wave characteristic when the second identity device is within the proximity of the motor vehicle;

determining, using a controller positioned within the motor vehicle and coupled to the sensor, a first distance between a distance reference in the driver area and the first identity device based on the sensed first signal wave characteristic, and determining, using the controller, a second distance between the distance reference and the second identity device based on the sensed second signal wave characteristic;

designating, using the controller, the first identity device as an identity device of a driver when the first distance is less than the second distance and designating, using the controller, the second identity device as the identity device of the driver when the second distance is less than the first distance;

searching for, using the controller, establishing a first wireless connection between a mobile device associated with the sensed identity data of the designated identity device of the driver and the transceiver; and searching for, using the controller, establishing a second wireless connection between a previously paired mobile device and the transceiver when the first wireless connection cannot be established and ignoring a third wireless connection between any unpaired paired mobile device and the transceiver.

17. The method of claim 16, wherein the establishing the first wireless connection includes:
   detecting, using the controller, the mobile device associated with the sensed identity data of the designated identity device of the driver, and
   wirelessly connecting the detected mobile device to the transceiver.

18. The method of claim 17, wherein the step of detecting, using the controller, the mobile device associated with the sensed identity data of the designated identity device of the driver includes:
   matching the sensed identity data of the designated identity device of the driver against one or more records, and
   identifying the mobile device associated with the sensed identity data of the designated identity device of the driver based on the matched record.

19. The method of claim 17, wherein the step of detecting, using the controller, the mobile device associated with the sensed identity data of the designated identity device of the driver includes ignoring the rest of the one or more mobile devices.

20. The method of claim 16, wherein each of the first and the second identity devices is one of a passive radio frequency device or an active radio frequency device when the each of the first and the second identity devices is within about 1 m to about 5 m of the motor vehicle.

21. The method of claim 16, wherein,
   the step of sensing, using the sensor, the first signal wave characteristic includes sensing a first signal strength or amplitude of the first signal, and sensing the second signal wave characteristic includes sensing a second signal strength or amplitude of the second signal, and
   the step of determining, using the controller, the first distance is based on the sensed first signal strength or amplitude and the step of determining the second distance is based on the sensed second signal strength or amplitude, such that the first distance is determined to be less than the second distance when the sensed first signal strength or amplitude is greater than the sensed second signal strength or amplitude, and the second distance is determined to be less than the first distance when the sensed second signal strength or amplitude is greater than the sensed first signal strength or amplitude.

22. The method of claim 16, further comprising:
   establishing a wireless connection between the transceiver and an unpaired mobile device without any associated identity data stored in the memory when wireless connections with mobile devices of users having associated or paired identity data stored in the memory cannot be established.

* * * * *